Dec. 1, 1942.   A. J. F. SIEGERT   2,303,709
SUBSURFACE PROSPECTING
Filed June 18, 1940
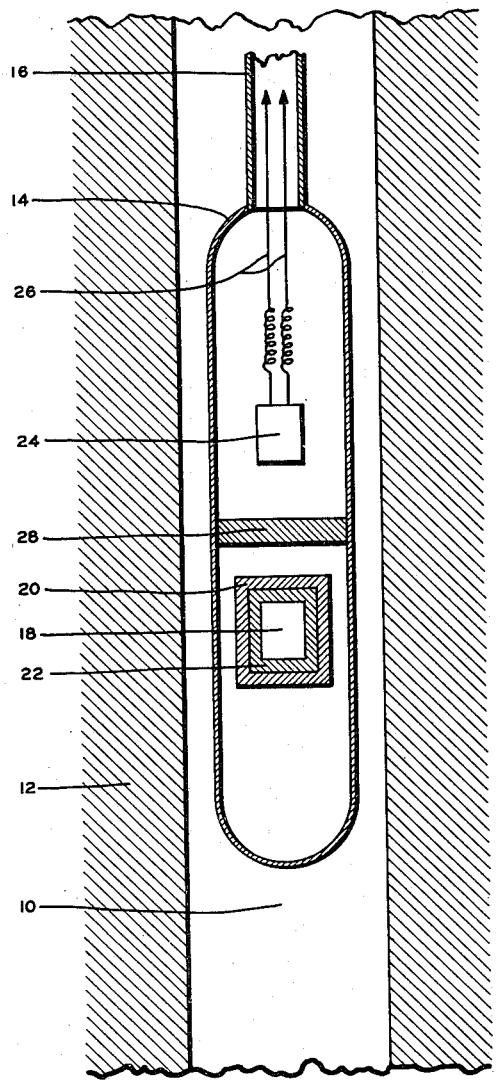
A.J. F. SIEGERT
INVENTOR
BY
HIS ATTORNEYS Patented Dec. 1, 1942

2,303,709

UNITED STATES PATENT OFFICE 2,303,709

SUBSURFACE PROSPECTING

Arnold J. F. Siegert, Houston, Tex., assignor to Texaco Development Corporation, New York, N. Y., a corporation of Delaware Application June 18, 1940, Serial No. 341,117

9 Claims. (Cl. 250—83.6)

This invention relates to subsurface prospecting and more particularly to a method and apparatus to be used in determining the nature of the formations through which a bore hole or well has been drilled. The principal object of the invention is to provide such a method and apparatus which will indicate positively and accurately the presence of hydrocarbon oil sands or formations when the device is passed through these formations and which method can be carried out with a minimum of time and effort.

In a co-pending application of Donald G. C. Hare filed May 29, 1940, Serial No. 337,862, a method and an apparatus is disclosed for logging the formations surrounding a bore hole by passing an instrument containing a source of highly penetrating particles such as neutrons through the hole and detecting certain of these particles which are scattered in the formations around the hole and returned to the instrument containing the source. It has been found that it may be of advantage to use neutrons of higher energy than those ordinarily obtained from the bombardment of a light element by such particles as may be emitted from natural radioactive sources. Through the use of faster neutrons, better penetration into the formations will be obtained and thus more complete knowledge concerning the nature of these formations.

In accordance with this invention, a source of neutrons is surrounded by a layer of a substance in which nuclear fission may take place such as uranium, thorium, protoactinium or a uranium compound. It is known to those skilled in the art that when these substances are bombarded by neutrons having the proper energy, that nuclear fissures may take place, the parent atom of uranium or the like substance being split into two or more atoms of lower atomic number. This reaction is known to be exoergic in nature and it is also known that during such a fissure or transformation a certain number of neutrons of very high energy are emitted. It is further apparent in the light of recent experiments that the number of neutrons available with the source surrounded by uranium may be greater than when the source alone is used. Furthermore, the efficiency of the uranium-neutron reaction may be increased by slowing down the neutrons from the source by a certain amount before they reach the uranium. To this end a hydrogenic substance such, for instance, as paraffin or water is inserted between the source and the uranium.

For a better understanding of the invention, reference may be had to the accompanying drawing which is a sectional elevation through part of a formation surrounding a bore hole and showing in section an instrument embodying the invention.

Referring to the drawing, a bore hole 10 has been drilled through a formation 12. An instrument comprising a casing 14 is adapted to be lowered and raised through the hole by means of a string of tubing 16 or a suitable wire line or cable. Disposed within the casing 14 is a source 18 of neutrons which source may, for instance, be a mixture of radium and beryllium, as is well known in this art. A layer of uranium 20 is disposed to entirely or partially surround the source 18 and within the space between the source 18 and the uranium 20 is inserted a hydrogenic substance such as layer of paraffin 22. Also disposed within the casing 14 is a detector 24 such as a Geiger-Muller counter suitable for detecting slow neutrons or a similar device such as a boron trifluoride ionization chamber. This device is connected by means of wires 26 to a suitable linear amplifier, not shown, at the surface. This particular type of detector does not form a part of the invention and various other devices may be used for accomplishing the same result. Between the source 18 and the detector 24 is disposed a shield 28 preferably of lead for eliminating any unwanted direct gamma radiation from the source to the detector which might otherwise cause an unwanted background effect. The lead will tend to prevent passage of slow neutrons directly from the source to the detector and the fast neutrons which may pass through the lead are not easily detected by means of the device 24.

In operation the device is passed through the bore hole 10 and neutrons emitted from the source 18 pass into the formation 12 surrounding the hole. Through the arrangement of the uranium around the source a number of neutrons of very high energy are emitted and these neutrons will possess considerably higher energy than those ordinarily obtained as by means of an ordinary radium-beryllium source. Because of the presence of the hydrogenic substance 22 around the source, the neutrons will be slowed down a certain amount which will increase the efficiency of the uranium-neutron reaction. As the instrument is passed through the hole a greater or lesser number of neutrons will reach the detector 24 depending upon the nature of the formation through which the device is passed. The presence of hydrogen in the formation will cause increased scattering and slowing up of the particles and thus the detector will register a larger number of returned slow neutrons than would be the case where the formation has little or no hydrogen content.

It is to be understood that although the use of uranium has been described, substances other than uranium such as thorium, protoactinium or uranium compounds may be used to give the proper type of reaction and also that other suitable sources for supplying the original neutrons such as radium-lithium may be utilized.

Obviously many other modifications and variations of the invention as hereinbefore set forth may be made without departing from the spirit and scope thereof, and therefore only such limitations should be imposed as are indicated by the appended claims.

I claim:

1. In the process of investigating the formations surrounding a bore hole in which highly penetrating particles such as neutrons are caused to enter the formation and to be scattered therein, certain of the neutrons being returned to a detector disposed near the source of the particles, the method of increasing the number and energy of the neutrons caused to enter the formation which comprises surrounding the source of neutrons with a substance in which nuclear fission may take place so that said substance will be bombarded by the neutrons from said source to cause nuclear fissions with attendant liberation of neutrons, whereby the neutrons leaving the surrounding substance will have a higher energy and will be greater in number than those leaving the source.

2. In the process of investigating the formations surrounding a bore hole in which highly penetrating particles such as neutrons are caused to enter the formation and to be scattered therein, certain of the neutrons being returned to a detector disposed near the source of the particles, the method of increasing the number and energy of the neutrons caused to enter the formation which comprises surrounding the source of neutrons with a layer of uranium so that said uranium will be bombarded by the neutrons to cause nuclear fissions to take place, whereby the neutrons leaving the uranium be greater in number and will have a higher energy than those leaving the source.

3. In the process of investigating the formations surrounding a bore hole in which highly penetrating particles such as neutrons are caused to enter the formation and to be scattered therein, certain of the neutrons being returned to a detector disposed near the source of the particles, the method of increasing the energy of the neutrons caused to enter the formation which comprises surrounding the source of neutrons with a layer of thorium so that said thorium will be bombarded by the neutrons to cause nuclear fissions to take place, whereby the neutrons leaving the thorium will have a higher energy than those leaving the source.

4. In the process of investigating the formations surrounding a bore hole in which highly penetrating particles such as neutrons are caused to enter the formation and to be scattered therein, certain of the neutrons being returned to a detector disposed near the source of the particles, the method of increasing the energy of the neutrons caused to enter the formation which comprises surrounding the source of neutrons with a layer of protoactinium so that said protoactinium will be bombarded by the neutrons to cause nuclear fissions to take place, whereby the neutrons leaving the protoactinium will have a higher energy than those leaving the source.

5. In the process of investigating the formations surrounding a bore hole in which highly penetrating particles such as neutrons are caused to enter the formation from a source in said hole and to be scattered in said formation, certain of the neutrons being returned to a detector disposed in the hole near the source of the particles, the method of increasing the energy and number of the neutrons caused to enter the formation which comprises surrounding the source of neutrons with a layer of a substance containing hydrogen so as to slow down the neutrons emitted from said source, and surrounding the layer of said substance with a layer of a material in which nuclear fission may take place so that said material will be bombarded by the slowed neutrons to cause nuclear fissions with attendant liberation of neutrons, whereby the neutrons leaving said material will have a higher energy and will be greater in number than those leaving said source.

6. In the process of investigating the formations surrounding a bore hole in which highly penetrating particles such as neutrons are caused to enter the formation and to be scattered therein, certain of the neutrons being returned to a detector disposed near the source of the particles, the method of increasing the energy and number of the neutrons caused to enter the formation which comprises surrounding the source of neutrons with a layer of paraffin so as to slow down the neutrons emitted from said source, surrounding the layer of paraffin with a layer of a material in which nuclear fission may take place so that said material will be bombarded by the slowed neutrons to cause nuclear fissions, whereby the neutrons leaving said material will have a higher energy and will be greater in number than those leaving said source.

7. In the process of investigating the formations surrounding a bore hole in which highly penetrating particles such as neutrons are caused to enter the formation from a source in said hole and to be scattered within said formation, certain of the neutrons being returned to a detector disposed in the hole near the source of the particles, the method of increasing the energy of the neutrons caused to enter the formation which comprises surrounding the source of neutrons with a layer of paraffin so as to slow down the neutrons emitted from said source, surrounding the layer of paraffin with a layer of uranium so that said uranium will be bombarded by the slowed neutrons to cause nuclear fissions, whereby the neutrons leaving the uranium will have a higher energy than those leaving said source.

8. A device for logging the formations surrounding a bore hole which comprises a casing, means for lowering and raising said casing within said hole, a source of neutrons disposed within said casing, a layer of uranium surrounding said source and a device disposed within said casing for detecting neutrons which have penetrated said formation to be scattered therein and returned to said device.

9. A device for logging the formations surrounding a bore hole which comprises a casing, means for lowering and raising said casing within said hole, a source of neutrons disposed within said casing, a layer of uranium surrounding said source, a layer of a hydrogen-containing substance disposed between said source and said uranium, and a device disposed within said casing for detecting neutrons which have penetrated said formation to be scattered therein and returned to said device.

ARNOLD J. F. SIEGERT.